May 17, 1960

J. E. JONES ET AL 2,937,089

SUPERSENSITIZED PHOTOGRAPHIC EMULSIONS
CONTAINING SULFONATED COMPOUNDS

Filed March 30, 1956

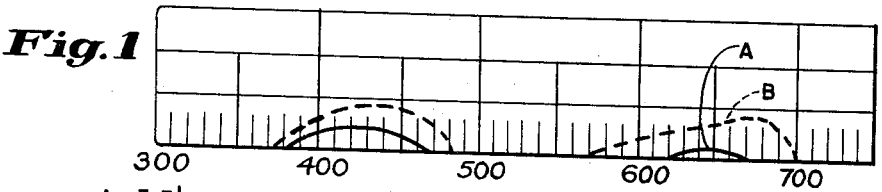

A = 3,3'- DIETHYLOXATHIADICARBOCYANINE IODIDE
B = 3,3'- DIETHYLOXATHIADICARBOCYANINE IODIDE PLUS 3,7-BIS (p-TOLYLAMIDO)-2,8-DISULFODIBENZOTHIOPHENE-5,5-DIOXIDE SODIUM SALT

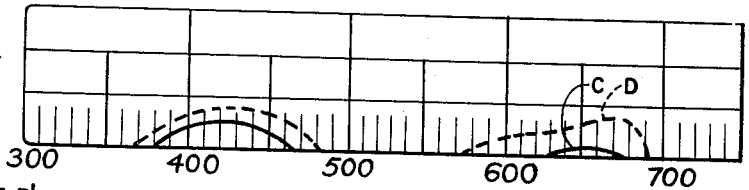

C = 3,3'- DIETHYLOXATHIADICARBOCYANINE IODIDE
D = 3,3'- DIETHYLOXATHIADICARBOCYANINE IODIDE PLUS 3,7-BIS (4-METHYL-2-METHOXYBENZAMIDO)-2,8-DISULFODIBENZOTHIOPHENE-5,5-DIOXIDE SODIUM SALT

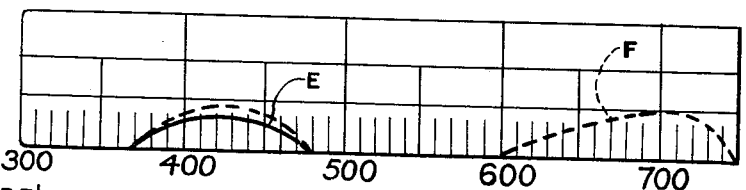

E = 3,3'- DIETHYLTHIADICARBOCYANINE IODIDE
F = 3,3'- DIETHYLTHIADICARBOCYANINE IODIDE PLUS 3-[4-(4-METHOXY-3-SULFOBENZAMIDO) PHENYL]-7-(4-METHOXY-3-SULFOBENZAMIDO) DIBENZOTHIOPHENE-5,5-DIOXIDE SODIUM SALT

John Spence
James A. Van Allan
Jean E. Jones
INVENTORS

BY

ATTORNEYS

United States Patent Office 2,937,089
Patented May 17, 1960

2,937,089

SUPERSENSITIZED PHOTOGRAPHIC EMULSIONS CONTAINING SULFONATED COMPOUNDS

Jean E. Jones, John Spence, and James A. Van Allan, Rochester, N.Y., assignors to Eastman Kodak Company, Rochester, N.Y., a corporation of New Jersey Application March 30, 1956, Serial No. 575,160

18 Claims. (Cl. 96—100)

This invention relates to photographic emulsions containing dicarbocyanine dyes, and in supersensitizing combination therewith, certain sulfonated compounds.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found another means of altering the sensitivity in emulsions containing dicarbocyanine dyes. Since the conditions in the emulsion, i.e., the hydrogen ion and/or the silver ion concentration undergo little or no change in our method, we shall designate our method as a kind of supersensitization.

It is, therefore, an object of our invention to provide photographic emulsions containing dicarbocyanine dyes and, in supersensitizing combination therewith, certain sulfonated compounds. Another object is to provide photographic emulsions which are especially useful in color photography. Still another object is to provide methods for making these emulsions. Other objects will become apparent from a consideration of the following description and examples.

The dicarbocyanine dyes which are useful in practicing our invention include, for example, those represented by the following general formula:

(I)
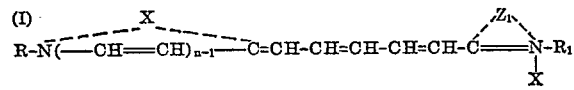

wherein R and $R_1$ each represents an alkyl group, such as methyl, ethyl, β-hydroxyethyl, carboxymethyl, β-carboxyethyl, carbomethoxymethyl, carbethoxymethyl, etc., $n$ represents a positive integer of from 1 to 2, X represents an acid radical, such as chloride, iodide, bromide, perchlorate, p-toluenesulfonate, benzenesulfonate, ethylsulfate, methylsulfate, etc., Z represents the non-metallic atoms necessary to complete a heterocyclic nucleus containing from 5 to 6 atoms in the heterocyclic ring, e.g., a heterocyclic nucleus of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethylbenzothiazole, 5-hydroxybenzothiazole, 6-hydroxybenzothiazole, etc.), a heterocyclic nucleus of the naphthothiazole series (e.g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e.g., benzoselenazole, 5-chlorobenzoselenazole, 6-methoxybenzoselenazole, 5-methoxybenzoselenazole, etc.), a heterocyclic nucleus of the naphthoselenazole series (e.g., α-naphthoselenazole, β-naphthoselenazole, etc.), a heterocyclic nucleus of the benzoxazole series (e.g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e.g., α-naphthoxazole, β-naphthoxazole, etc.), a heterocyclic nucleus of the 2-quinoline series (e.g., 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.) a heterocyclic nucleus of the 4-quinoline series (e.g., 4-quinoline, 6-methoxy-4-quinoline, 7-methyl-4-quinoline, 8-methyl-4-quinoline etc.), a heterocyclic nucleus of the benzimidazole series (e.g., benzimidazole, 5-chlorobenzimidazole, 5,6-dichlorobenzimidazole, 1,7-trimethylenebenzimidazole, etc.), and a heterocyclic nucleus of the 5,6-benzoquinoline series (e.g., 5,6-benzo-2-quinoline, etc.), etc., and $Z_1$ represents the non-metallic atoms necessary to complete a heterocyclic nucleus selected from the group consisting of those of the benzoxazole series (e.g., such as those defined by Z above), those of the naphthoxazole series (e.g., such as those defined by Z above), those of the benzoselenazole series (e.g., such as those defined by Z above), those of the naphthoselenazole series (e.g., such as those defined by Z above), those of the benzothiazole series (e.g., such as those defined by Z above), those of the naphthothiazole series (e.g., such as those defined by Z above), etc.

The sulfonated derivatives useful in practicing our invention comprise polycyclic aromatic sulfonic acids, or salts thereof, and dibenzothiophene dioxide compounds containing at least one sulfonic acid group, or salts thereof. The term "polycyclic aromatic" as used herein is intended to mean two or more benzene rings fused together (for example, as in naphthalene, pyrene, etc.) or at least two benzene rings directly joined together (for example, as in diphenyl, terphenyls, etc.). By dibenzothiophene dioxide we mean the ring system:

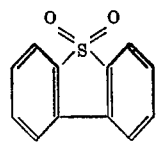

Of course, both the dibenzothiophene dioxide and polycyclic aromatic compounds contain at least one sulfonic acid group, or a salt thereof. Particularly useful polycyclic aromatic compounds contain from 12 to 30 carbon atoms. Particularly useful dibenzothiophene compounds containing at least one sulfo group (or salt) include those represented by the following general formula:

II.
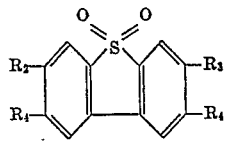

wherein $R_2$ is an acylamido group (e.g., acetamido, sulfobenzamido, 4-methoxy-3-sulfobenzamido, 2-ethoxybenzamido, 2,4-diethoxybenzamido, p-tolylamido, 4-methyl-2-methoxybenzamido, 1-naphthylamido, 2-naphthylamido, 2,4-dimethoxybenzamido, 2-phenylbenzamido, 4-methoxybenzamido, 2-thienylamido, etc.), or a sulfo group, $R_3$ represents an acylamido group (e.g., as defined by $R_2$ above), or a sulfoaryl group (e.g., sulfophenyl, p'-sulfodiphenyl, etc.), and $R_4$ represents a hydrogen atom or a sulfo group.

The dicarbocyanine dyes useful in practicing our invention can be prepared according to methods previously described in the art. Such methods are illustrated in the copending applications of B. H. Carroll et al. Serial Nos. 540,052–4, filed October 12, 1955 (Serial No. 540,053, issued as Patent No. 2,875,058, on February 24, 1959).

The dibenzothiophene dioxide compounds useful in practicing our invention can be prepared in a manner illustrated below. Compounds wherein $R_2$ and $R_3$ represent an acylamido group can be prepared as described in U.S. Patents 2,573,652 and 2,580,234. See also U.S. Patent 2,563,493, issued August 7, 1951.

The sulfonated derivatives which can advantageously be used in practicing our invention include those represented by the following formulas:

(1)
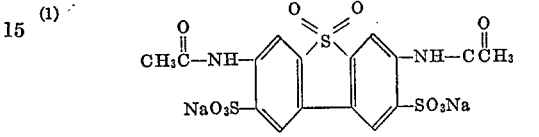

3,7-diacetamido-2,8-disulfodibenzothiophene dioxide sodium salt (2)
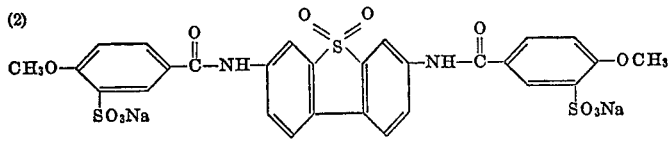

3,7-bis(4-methoxy-3-sulfobenzamido)dibenzothiophene dioxide sodium salt (3)
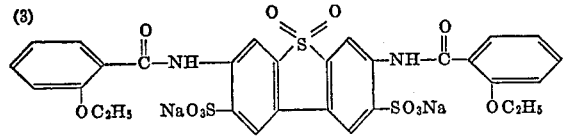

3,7-bis(2-ethoxybenzamido)-2,8-disulfodibenzothiophene dioxide sodium salt (4)
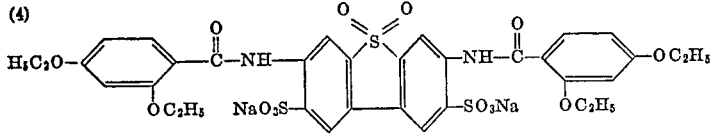

3,7-bis(2,4-diethoxybenzamido)-2,8-disulfodibenzothiophene dioxide sodium salt (5)
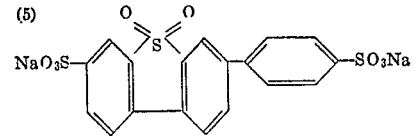

3-(4-sulfophenyl)-7-sulfodibenzothiophene dioxide sodium salt (6)
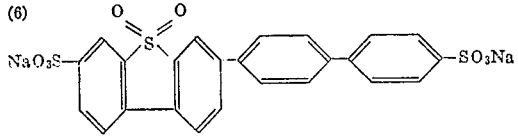

3-(4'-sulfobiphenylyl)-7-sulfodibenzothiophene dioxide sodium salt (7)
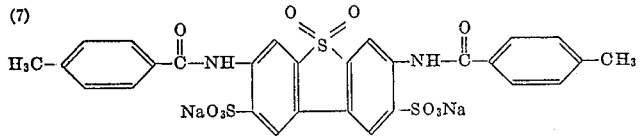

3,7-bis(p-tolylamido)-2,8-disulfodibenzothiophene dioxide sodium salt (8)
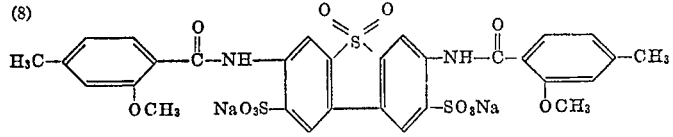

3,7-bis(4-methyl-2-methoxybenzamido)-2,8-disulfodibenzothiophene dioxide sodium salt (9)
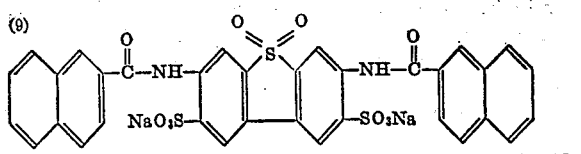
3,7-bis(2-naphthylamido)-2,8-disulfodibenzothiophene dioxide sodium salt

(10)
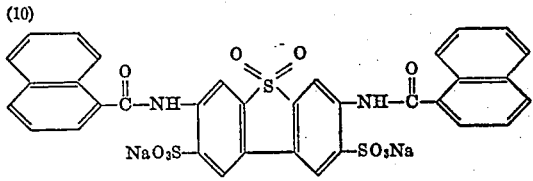
3,7-bis(1-naphthylamido)-2,8-disulfodibenzothiophene dioxide sodium salt

(11)
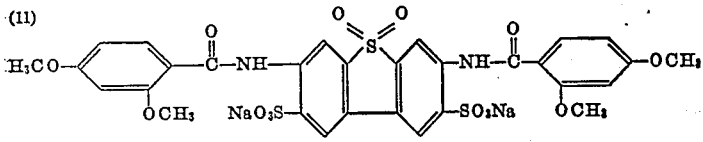
3,7-bis(2,4-dimethoxybenzamido)-2,8-disulfodibenzothiophene dioxide sodium salt

(12)
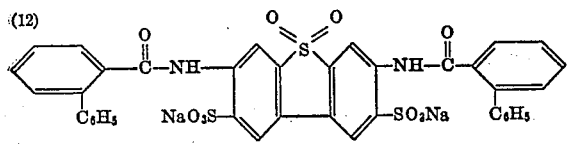
3,7-bis(2-phenylbenzamido)-2,8-disulfodibenzothiophene dioxide sodium salt

(13)
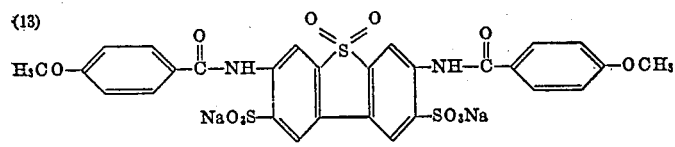
3,7-bis(4-methoxybenzamido)-2,8-disulfodibenzothiophene dioxide sodium salt

(14)
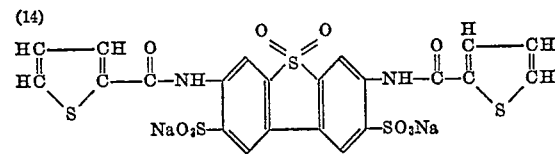
3,7-bis(2-thienylamido)-2,8-disulfodibenzothiophene dioxide sodium salt

(15)
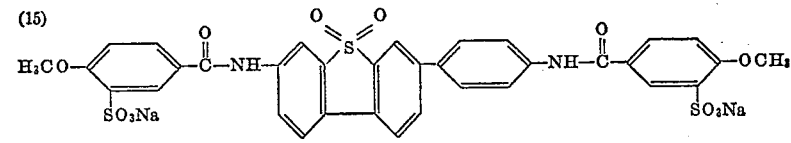
3-[4-(4-methoxy-3-sulfobenzamido)phenyl]-7-(4-methoxy-3-sulfobenzamido)dibenzothiophene dioxide sodium salt

(16)
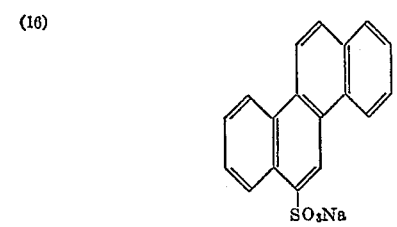
Chrysene-6-sulfonic acid sodium salt

(18)
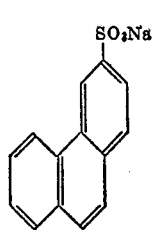
Phenanthrene-3-sulfonic acid sodium salt

(17)
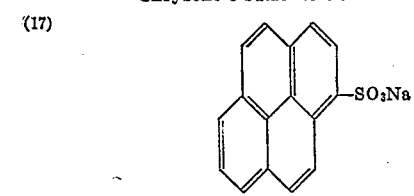
Pyrene-3-sulfonic acid sodium salt

(19)
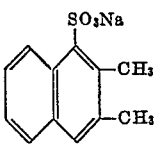
2,3-dimethylnaphthalene-1-sulfonic acid sodium salt

(20)
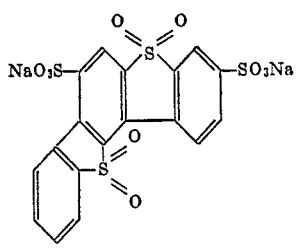
5,9-disulfo-7,12-dithiaindeno[1,2-a]fluorene-7,12-bisdioxide sodium salt

(21)
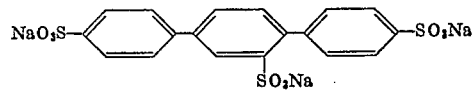
p-Terphenyl-4',4'',2-trisulfonic acid sodium salt

(22)
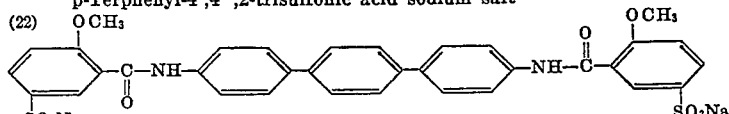
4',4''-bis(2-methoxy-5-sulfobenzamido)-p-terphenyl sodium salt

(23)
4',4''-bis(2-ethoxy-5-sulfobenzamido)-p-terphenyl sodium salt

(24)
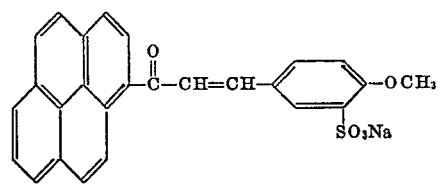
Pyrene-3-(4-methoxy-3-sulfostyryl)ketone sodium salt

(25)
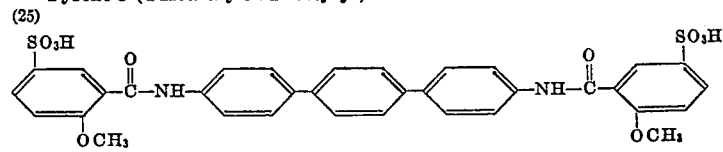
4',4''-bis(2-methoxy-5-sulfobenzamido)-p-terphenyl (used as triethanolamine salt)

(26)
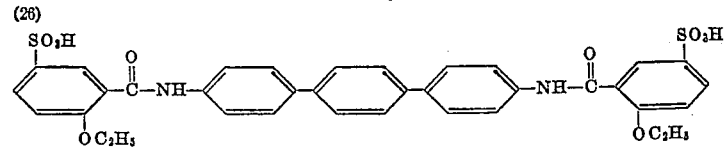
4',4''-bis(2-ethoxy-5-sulfobenzamido)-p-terphenyl (used as triethanolamine salt)

As can be seen above, many of the sulfonated derivatives are employed in the form of their water-soluble salts, such as alkali metal (e.g., sodium, potassium, etc.) salts, or ammonium or amine (e.g., triethylamine, triethanolamine, pyridine, aniline, etc.) salts. By thus using these derivatives, they can be added to the emulsions in substantially neutral aqueous solutions without disturbing the pH of the emulsions.

According to our invention, we incorporate one or more of the dicarbocyanine dyes selected from those represented by Formula I above with one or more of the sulfonated derivatives of the type described above in a photographic emulsion. Our invention is particularly directed to the ordinarily employed gelatino-silver-halide emulsions. However, our supersensitizing combinations can be employed in silver halide emulsions in which the carrier is other than gelatin, e.g., a resinous substance or cellulose material which has no deteriorating effect on the silver halides.

The dicarbocyanine dyes and sulfonated derivatives can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing our invention, the dicarbocyanine dyes are advantageously employed in a concentration approximating their optimum concentration (i.e., the concentration at which the dye gives greatest sensitivity). In general, the sulfonated derivatives employed in our invention have little or no sensitizing action in the emulsions employed.

The optimum concentration of an individual sensitizing dye can be determined in a manner well known to those skilled in the art by measuring the sensitivity of a series of test portions of the same emulsion, each portion containing a different portion of the sensitizing dye. The optimum concentration of the dicarbocyanine dyes used in our invention can, of course, be readily determined in the same manner by measuring the sensitivity of a series of test portions of the emulsion, each portion containing a different concentration of the dicarbocyanine dye to be used in the combination. In determining the optimum concentration for the supersensitizing combination, it is advantageous to employ at first a concentration of the dicarbocyanine dye less than its optimum concentration, and then gradually increase the concentration of the dicarbocyanine dye until its optimum concentration is determined.

Ordinarily, the optimum or near optimum concentration of the dicarbocyanine dyes useful in practicing our invention is of the order of from 0.02 to 0.3 g. per mole of silver halide in the emulsion.

The sulfonated derivatives useful in practicing our invention can advantageously be employed in concentrations on the order of from 0.02 to 10.0 g. per mole of silver halide in the emulsion.

Generally speaking, the ratio of concentration of the dicarbocyanine dye to the sulfonated derivative can vary rather widely in our combinations, e.g., from 1:100 to 1:1 (by weight) in many instances.

The methods of incorporating sensitizing dyes in emulsions are well known to those skilled in the art, and as mentioned above, the sulfonated derivatives of our invention can be incorporated in the emulsions conveniently in substantially neutral aqueous solution. In practicing our invention, the dicarbocyanine dyes and sulfonated derivatives can be incorporated in the emulsions separately or together. Frequently, it is convenient to add the dicarbocyanine dyes and sulfonated derivatives separately in the form of solutions in appropriate solvents. Methanol, ethanol, pyridine, etc., have proven satisfactory as solvents for the dicarbocyanine dyes which we employ in our invention, although acetone has also been found to be satisfactory in certain cases. If desired, a mixture of solvents, such acetone and pyridine, can be employed. The dicarbocyanine dyes and sulfonated derivatives can be added to the emulsions in any given order, although we have found that sometimes improved results can be obtained if the sulfonated derivatives are added prior to the dicarbocyanine dyes. The dicarbocyanine dyes and sulfonated derivatives are advantageously incorporated in the finished, washed emulsions and should be uniformly distributed throughout the emulsions. The following procedure is satisfactory: Stock solutions of the dicarbocyanine dyes and sulfonated derivatives desired are prepared by dissolving the same in appropriate solvents as described above. Then, to the flowable gelatino-silver-halide emulsion, the desired amounts of the stock solution of one of the dicarbocyanine dyes (or sulfonated derivatives) is slowly added, while stirring the emulsion. Stirring is continued until the dye is thoroughly incorporated in the emulsion. Then, the desired amount of the stock solution of the sulfonated derivative (or dicarbocyanine dye, if sulfonated derivative has been added first) is slowly added to the emulsion, while stirring. Stirring is continued until the second ingredient is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the dicarbocyanine dyes and sulfonated derivatives actually incorporated in the emulsion will vary somewhat from case to case, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly, our invention is directed to any emulsion containing a combination of the aforesaid dicarbocyanine dyes and sulfonated derivatives whereby a supersensitizing effect is obtained.

The following examples will serve to illustrate further the manner of practicing our invention. To different portions of the same batch of photographic gelatino-silver-bromiodide emulsion were added (1) a dicarbocyanine dye selected from those of Formula I and (2) a combination of the dicarbocyanine dye of Formula I and a sulfonated derivative as defined above. Before coating, the emulsions containing the addenda were digested for a short time in a tank maintained at 50–52° C. The different portions of emulsion were then coated on supports and exposed in the usual manner in a spectrograph and sensitometer (type Ib) through a Wratten 25 Filter, i.e., a filter which transmits substantially no light of wavelengths shorter than 580 mu. The exposed coatings were than processed for a short time (3 or 4 minutes) in a developer having the following composition:

| | G. |
|---|---|
| N-methyl-p-aminophenolsulfate | 2.0 |
| Hydroquinone | 8.0 |
| Sodium sulfite (anhydrous) | 90.0 |
| Sodium carbonate (monohydrate) | 52.5 |
| Potassium bromide | 5.0 |
| Water to make one liter. | |

As mentioned above, no data showing the sulfonated derivatives alone are given, since it has been found that these derivatives have little or no sensitizing action on the emulsions used. Different emulsions were used in some of the examples, although the emulsions of each individual example were obtained from the same batch. However, the coatings of Examples 1 to 3 were obtained from the same batch of emulsion, the coatings of Examples 4 to 6 were obtained from the same batch of emulsion, and the coatings of Examples 15 to 22 were obtained from the same batch of emulsion. The speed (red), gamma and fog for each of the coatings are given in the following table. The speed figures given in Ex-

TABLE A

| Example | Addenda (g./mol. AgX) | Red Light Exposure | | |
|---|---|---|---|---|
| | | Speed | Gamma | Fog |
| 1 | (a) 3,3'-diethyloxathiadicarbocyanine iodide (.050) | 100 | 3.68 | .04 |
| | (b) dye (a) (.050) plus compound 1 (4.0) | 360 | 5.20 | .07 |
| 2 | (c) dye (a) (.050) plus compound 3 (4.0) | 195 | 4.90 | .06 |
| 3 | (d) dye (a) (.050) plus compound 6 (4.0) | 905 | 4.10 | .05 |
| 4 | (e) dye (a) (.050) | 100 | 4.20 | .05 |
| | (f) dye (a) (.050) plus compound 2 (4.0) | 720 | 4.10 | .06 |
| 5 | (g) dye (a) (.050) plus compound 4 (4.0) | 225 | 4.50 | .08 |
| 6 | (h) dye (a) (.050) plus compound 5 (4.0) | 230 | 5.70 | .06 |
| 7 | (i) dye (a) (.050) | 100 | 5.3 | .06 |
| | (j) dye (a) (.050) plus compound 24 (4.0) | 350 | 5.5 | .07 |
| 8 | (k) dye (a) (.050) | 100 | 4.2 | .06 |
| | (l) dye (a) (.050) plus compound 18 (4.0) | 295 | 5.4 | .06 |
| 9 | (m) dye (a) (.050) | 100 | 4.7 | .07 |
| | (n) dye (a) (.050) plus compound 19 (4.0) | 235 | 5.0 | .05 |
| 10 | (o) 3,3'-di-β-hydroxyethylthiadicarbocyanine bromide (.050) | 3.5 | .66 | .05 |
| | (p) dye (o) (.050) plus compound 5 (6.0) | 4.7 | .88 | .06 |
| 11 | (q) 3,3'-diethylthiadicarbocyanine iodide (.045) | 5.4 | 2.1 | .05 |
| | (r) dye (q) (.045) plus compound 15 (1.0) | 90.5 | 2.7 | .06 |
| 12 | (s) 3,3'-diethylselenadicarbocyanine iodide (.045) | 2.7 | 2.9 | .06 |
| | (t) dye (s) (.045) plus compound 15 (1.0) | 50.0 | 2.6 | .06 |
| 13 | (u) 3,3'-diethyl-4,5,4',5'-dibenzothiadicarbocyanine iodide (.045) | 5.6 | 3.1 | .10 |
| | (v) dye (u) (.045) plus compound 15 (1.0) | 41.5 | 2.9 | .07 |
| 14 | (w) 3,3'-diethyloxadicarbocyanine iodide (.045) | 7.6 | 3.2 | .07 |
| | (x) dye (w) (.045) plus compound 15 (1.0) | 50.0 | 2.6 | .08 |
| 15 | (y) dye (a) (.050) | 3.1 | .92 | .05 |
| | (z) dye (a) (.050) plus compound 7 (1.0) | 16.5 | 1.9 | .06 |
| 16 | (a') dye (a) (.050) plus compound 8 (1.0) | 15.0 | 1.9 | .06 |
| 17 | (b') dye (a) (.050) plus compound 9 (1.0) | 7.7 | 1.8 | .07 |
| 18 | (c') dye (a) (.050) plus compound 10 (1.0) | 12.5 | 2.1 | .06 |
| 19 | (d') dye (a) (.050) plus compound 11 (1.0) | 10.2 | 1.9 | .06 |
| 20 | (e') dye (a) (.050) plus compound 12 (1.0) | 9.0 | 1.8 | .07 |
| 21 | (f') dye (a) (.050) plus compound 13 (1.0) | 13.7 | 2.1 | .06 |
| 22 | (g') dye (a) (.050) plus compound 14 (1.0) | 6.2 | 1.7 | .06 |
| 23 | (h') dye (a) (.045) | 5.2 | 1.5 | .05 |
| | (i') dye (a) (.045) plus compound 25 (1.0) | 28.5 | 2.8 | .06 |
| 24 | (j') dye (a) (.045) | 5.4 | 1.8 | .06 |
| | (k') dye (a) (.045) plus compound 26 (1.0) | 15.4 | 2.0 | .06 | amples 1 to 9 are relative, while the figures given in Examples 10 to 24 are 30/E speeds, where E is the exposure in meter candles seconds required to give a density of 0.2 above fog.

The accompanying drawing illustrates the supersensitizing effect obtained with three of our new supersensitizing combinations in gelatino-silver-bromiodide emulsions. Each figure in the drawing is a diagrammatic reproduction of two spectrograms. In each figure, the sensitivity of the emulsion containing a dicarbocyanine dye is represented by the solid lower curve. The sensitivity of the emulsion containing the dicarbocyanine dye and a sulfonated derivative of the type described above is represented by the curve consisting of dotted lines. No curves showing the sensitivity of the emulsion containing the sulfonated derivative alone are shown, since it has been found that these sulfonated derivatives do not generally have any appreciable sensitizing action of their own when incorporated in photographic emulsions.

In Figure 1, curve A represents the sensitivity of an ordinary gelatino-silver-bromiodide emulsion sensitized with 3,3'-diethyloxathiadicarbocyanine iodide, while curve B represents the sensitivity of the same emulsion containing 3,3'-diethyloxathiadicarbocyanine iodide and 3,7 - bis(p - tolylamido) - 2,8 - disulfodibenzothiophene - 5,5-dioxide sodium salt. The sensitometric measurements for these emulsions are given in Example 15 of Table A.

In Figure 2, curve C represents the sensitivity of an ordinary gelatino-silver-bromiodide emulsion sensitized with 3,3'-diethyloxathiadicarbocyanine iodide, while curve D represents the sensitivity of the same emulsion sensitized with 3,3'-diethyloxathiadicarbocyanine iodide and 3,7-bis(4-methyl-2-methoxybenzamido)-2,8-disulfodibenzothiophene-5,5-dioxide sodium salt. The sensitometric measurements for these emulsions are given in Example 16 of Table A.

In Figure 3, curve E represents the sensitivity of an ordinary gelatino-silver-bromiodide emulsion sensitized with 3,3'-diethylthiadicarbocyanine iodide, while curve F represents the sensitivity of the same emulsion sensitized with 3,3'-diethylthiadicarbocyanine and and 3-[4-(4-methoxy - 3 - sulfobenzamido)phenyl] - 7 - (4 - methoxy - 3 - sulfobenzamido)dibenzothiophene - 5,5 - dioxide sodium salt. The sensitometric measurements for these emulsions are given in Example 11 of Table A.

Our invention is primarily directed to the ordinarily employed gelatino-silver-halide developing-out emulsions, e.g., gelatino-silver-chloride, -chlorobromide, -chloroiodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsions set forth in U.S. Patent 2,456,956, dated December 21, 1948, can also be employed in practicing our invention.

The emulsions prepared in accordance with our invention can be coated in the usual manner on any suitable support, e.g., glass, cellulose nitrate film, cellulose acetate film, polyvinylacetal resin film, paper or metal.

Photographic silver halide emulsions, such as those listed above, containing the supersensitizing combinations of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; anti-foggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, issued June 2, 1953, etc.; or mixtures of such addenda. Dispersing agents for color couplers, such as those set forth in U.S. Patents 2,322,027 and 2,304,940, can also be employed in the above-described emulsions.

As mentioned above, the supersensitizing combinations of our invention can be employed in emulsions intended for color photography, wherein color-forming compounds are incorporated in the photographic emulsions. It is known that many color-forming compounds of the type normally employed in photographic emulsions cause de-sensitizing and/or un-sensitizing effects. These effects appear to be particularly troublesome with respect to color-forming compounds for the magenta or cyan images. However, we have found that the sulfonated derivatives employed in our invention are quite useful in overcoming the de-sensitizing and/or un-sensitizing caused by these color-forming compounds. Typical color-forming compounds which can be employed advantageously in combination with the supersensitizing combinations of our invention include those in U.S. Patent 2,322,027 mentioned above and the following:

Coupler:
(1) 1 - hydroxy - 2 - [δ - (2',4' - di - tert.amylphenoxy)-n-butyl]-naphthamide (U.S. Patent 2,474,293)
(2) 1 - hydroxy - 4 - phenylazo - 4' - (p - tert. - butylphenoxy) - 2 - naphthanilide (U.S. Patent 2,521,908)
(3) - (2,4 - di -tert.amylphenoxyacetamino) - 4 - 6-dichloro-5-methyl phenol (U.S. Patent 2,725,291)
(4) 2 - (α - 2,4 - di - tert.amylphenoxy - n - butyrylamino)-4,6-dichloro-5-methyl phenol
(5) 6 - {α - {4 - [α - (2,4 - di - tert.amylphenoxy) butyramido] - phenoxy}acetamido} - 2,4 - dichloro-3-methyl phenol
(6) 2 - [3' - (2'',4'' - diamylphenoxy) - acetamido]-benzamido-4-chloro-5-methyl phenol
(7) 1 - (2',4',6' - trichlorophenyl) - 3 - [3'' - (2''', 4''' - di - tert.amylphenoxyacetamido) - benzamido]-5-pyrazolone (U.S. Patent 2,600,788)
(8) 1 - (2',4',6' - trichlorophenyl) - 3 - [3'' - (2''', 4''' - di - tert.amylphenoxyacetamido) - benzamido]-4-(p-methoxyphenylazo)-5-pyrazolone
(9) N - (4 - benzoylacetaminobenzenesulfonyl) - N-(γ-phenylpropyl)-p-toluidine (U.S. Patent 2,298,443)
(10) α - o - Methoxybenzoyl - α - chloro - 4 - [α - (2,4 - di - tert.amylphenoxy) - n - butyramido] - acetanilide (McCrossen U.S. application Serial No. 295,806, now U.S. Patent No. 2,728,658, dated December 27, 1955.
(11) α - {3 - [α - (2,4 - di - tert.amylphenoxy) acetamido]-benzoyl}-2-methoxyacetanilide
(12) 3 - benzoylacetamido - 4 - methoxy - 2',4' - di - tert.amylphenoxy acetanilide
(13) 4 - benzoylacetamido - 3 - methoxy - 2',4' - di - tert.amylphenoxy acetanilide The following examples will serve to illustrate the beneficial effects of our new supersensitizing combinations when employed in multilayer photographic emulsion layers containing incorporated color-forming compounds in the emulsions.

A photographic gelatino-silver-chlorobromide emulsion containing a coupler dispersion of a color-forming compound, such as coupler No. 5 above, was sensitized with dye (a) of Table A (.075 g./mol. AgX). To one portion of such sensitized emulsion was added a sulfonated derivative in the concentration indicated in the following table, while none was added to the remainder. In order to measure the beneficial effect of the sulfonated derivatives, a series of each portion of these emulsions was held at 40° C. for 30 minutes and 60 minutes, respectively, while another series was coated fresh (o' holding) on a baryta-coated paper support. The other series of coatings which had been held for 30 minutes and 60 minutes, were then coated on baryta-coated paper supports. The coatings were then exposed in the usual manner and color-developed in a developer having the following composition:

| | |
|---|---|
| Water (70–75° F.) cc | 80 |
| Sodium hexametaphosphate g | 2.0 |
| Sodium sulfite (anhydrous) g | 4.0 |
| Developer [1] g | 3.0 |
| Sodium carbonate (monohydrate) g | 20.0 |
| Potassium bromide g | 2.0 |
| Water to make one liter. | |

[1] 2-amino-5-diethylaminotoluene hydrochloride.

The coatings were then rinsed, fixed, bleached with potassium dichromate, etc., in the usual manner. The results are given in Table B.

TABLE B

| Example | Addenda (g./mol. AgX) | Holding Time (Minutes) | Speed Red | Speed Blue |
|---|---|---|---|---|
| 25 | (a) None | 0 | nil | .80 |
|    | (b) Compound 5 (5.0) | 0 | 1.38 | .81 |
| 26 | (a) None | 30 | nil | .83 |
|    | (b) Compound 5 (5.0) | 30 | .86 | .91 |
| 27 | (a) None | 60 | nil | .86 |
|    | (b) Compound 5 (5.0) | 60 | .68 | .91 |

In a manner similar to that illustrated in the above table, other sulfonated derivatives of our invention can be used to advantage in combination with dicarbocyanine dyes in photographic emulsions which contain color-forming compounds.

Methods of preparing sulfonated polycyclic compounds are well known and have been previously described in the prior art. See, for example, U.S. Patent 2,004,546, U.S. Patent 2,401,428 and U.S. Patent 2,470,629. The following examples will serve to illustrate further the method of preparing these sulfonated polycyclic compounds.

*Example A.—3-(4-sulfophenyl)-7-sulfodibenzothiophene-dioxide sodium salt and 4',4'',2-trisulfo-p-terphenyl*

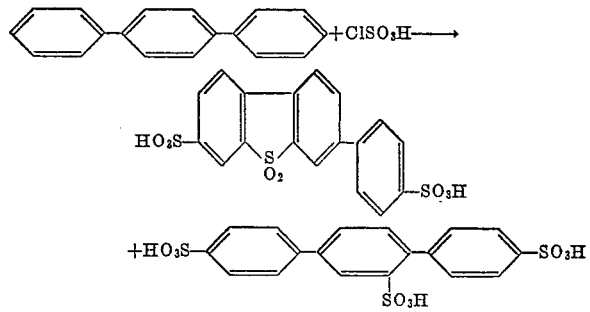

WITH CHLOROSULFONIC ACID 4,4'-diphenylbenzene, 40 g., was added to 200 ml. of chlorosulfonic acid. This addition was conducted slowly because of the vigorous evolution of hydrogen chloride. When the addition was complete, the mixture was heated on the steam bath at 85–90° C. for one hour. Complete solution ensued. The mixture was cooled and poured onto ice to precipitate the acid chloride which was filtered off and dissolved in dilute sodium hydroxide. The insoluble material was filtered off, and the filtrate was evaporated to dryness. The residue was extracted for 24 hours with methanol in a Soxlet extractor to give 23 g. of sodium p-terphenyl-4',4'',2-trisulfonate (compound 21). The residue from the extraction (57 g.) was taken up in 1200 ml. of hot water and filtered. The clear blue fluorescent filtrate was treated with a hot, saturated salt solution and cooled to give 31 g. of 3-(4-sulfophenyl)-7-sulfodibenzothiophene dioxide sodium salt (compound 5).

Analysis for $C_{18}H_{10}O_8Na_2S_3+H_2O$.—Calc'd.: C, 42.0; H, 2.0. Found: C, 42.0; H, 2.0.

A solution containing 10 g. of 3-(4-sulfophenyl)-7-sulfodibenzothiophenedioxide sodium salt in 150 ml. of hot water was treated with decolorizing charcoal and filtered. The filtrate was then added to a solution of 10 g. of 1,3-di-o-tolylguanidine hydrochloride in 150 ml. of water containing 3 ml. of concentrated hydrochloric acid. An immediate precipitate of the bisguanide salt was formed. Yield, 11 g.; M.P. 220–30° C. dec.

Analysis for $C_{48}H_{46}O_8N_6S_3+H_2O$.—Calc'd.: C, 60.9; H, 4.9; N, 8.8; S, 10.2. Found: C, 60.9; H, 5.6; N, 8.7; S, 10.0.

The bis-o-toluidine salt was made in a similar manner.

WITH 20 PERCENT OLEUM p-Terphenyl (40 g.) was treated with 20 percent oleum all at once. The temperature rose to 100° C. Stirring and heating on the water bath was continued for 3 hours, after which time the reaction mixture had solidified. After cooling, the mixture was added to 200 ml. of water, cooled, and filtered through a sintered glass funnel. The filter cake dissolved in 1200 ml. of water and made alkaline with caustic, chilled, and the precipitated sodium salt filtered off. The sodium salt was redissolved in 2 liters of water, filtered through decolorizing carbon, and saturated salt solution was added to give 26 g. of pure 3-(4-sulfophenyl)-7-sulfodibenzothiophene dioxide sodium salt.

In a manner similar to that illustrated in the above example m-terphenyl (20 g.) gave 23 g. of 5,9-disulfo-7,12-dithiaindeno[1,2-a]fluorene-7,12-bisdioxide sodium salt (compound 20). The di-o-toluidine salt of compound 20 (as monohydrate) had a melting point in excess of 274° C.

Analysis.—Calc'd.: C, 51.4; H, 3.8; S, 17.1; N, 3.8. Found: C, 50.9; H, 4.0; S, 16.0; N, 4.0.

In a manner similar to that illustrated in Example A above, 10 g. of p-quaterphenyl gave 8 g. of 3-(4'-sulfobiphenylyl)-7-sulfodibenzothiophene dioxide sodium salt (compound 6). The di-o-tolylguanidine salt melted at 195° C. upon recrystallization from butanol.

Analysis.—Calc'd.: C, 65.0; H, 4.0. Found: C, 64.8; H, 5.0.

Compound 6 was also prepared as follows:

p-Terphenyl (10 g.) was heated with 50 ml. of concentrated sulfuric acid at 200–210° C. for 15 minutes with good stirring. Complete solution ensued. After standing overnight, the precipitate was filtered off through a sintered glass funnel. The solid was taken up in water and made alkaline with caustic. The sodium salt separated. Yield, 9.1 g.

Compounds 25 and 26 were prepared by condensing the appropriate o-alkoxybenzoyl chloride with 4',4''-diamino-p-terphenyl, followed by sulfonation with chlorosulfonic acid. No ring closure producing a dibenzothiophene dioxide compound was noted, although sulfonation of the corresponding p-alkoxyl derivatives did produce substantial quantities of dibenzothiophene dioxide compounds. In reactions producing a mixture of sulfonated derivatives, it is not necessary to separate the same into the component compounds, although this can be done, if desired.

*Example B.*—*Pyrene-3-(4-methoxy-3-sulfostyryl)ketone sodium salt*

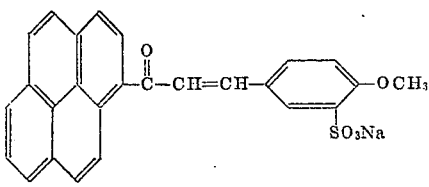

1.0 g. of 3-acetylpyrene was dissolved in 35 ml. of ethanol and this solution added to a solution of 1.0 g. of sodium-3-sulfo-4-anisaldehyde in 5 ml. of water, and a trace of aqueous sodium hydroxide added, whereupon a yellow color was produced. After standing overnight, the reaction mixture was filtered and the crystalline product (1.0 g) was rinsed with alcohol and dried in air.

*Example C.*—*2,3-dimethylnaphthalene-1-sulfonic acid sodium salt*

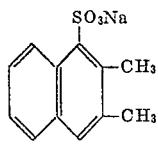

20 g. of 2,3-dimethylnaphthalene were mixed with 20 ml. of sulfuric acid, and the mixture was heated to 80° C. with stirring for 2 hours, or until the same was completely solubilized in dilute alkali. Water (100 ml.) was added and the mixture heated to boiling. Complete solution ensued on cooling. The desired acid separated as beautiful crystals from the blue fluorescent solution. The yield was 15 g. The desired sodium salt was obtained by dissolving the acid in alkali and evaporating to dryness. Either the free sulfonic acid or the sodium salt can be used to advantage in our invention.

Compound 17 was described according to the method described in "Annalen," vol. 531, page 106. The preparation of compound 16 is described in "Chemical Abstracts," vol. 31, page 1825. Compound 18 is described in "Chemical Abstracts," vol. 35, page 4009. Other compounds selected from those represented by Formula II above are described in U.S. Patents 2,563,795; 2,590,632 and 2,702,759.

The term "sulfo" is used in the foregoing specification and in the following claims to mean the free acid group, as well as salts of this free acid group, including alkali metal salts (e.g., sodium, potassium, etc.), ammonium salts, amine addition salts (e.g., triethylamine, ethanolamine, triethanolamine, pyridine, picolines, etc.). As mentioned above, one advantage of adding the sulfonated derivatives in the form of their salt solutions is that the pH of the solution is not disturbed. However, when using small quantities of sulfonated derivatives, the free acids can also be used to advantage.

What we claim as our invention and desire secured by Letters Patent of the United States is:

1. A photographic silver halide emulsion sensitized with a supersensitizing combination of at least one dicarbocyanine dye selected from those represented by the following general formula:

(1)
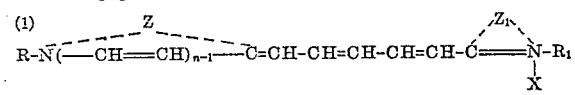

wherein R and $R_1$ each represents an alkyl group containing from 1 to 4 carbon atoms, $n$ represents a positive integer of from 1 to 2, X represents an acid radical, Z represents the non-metallic atoms necessary to complete a heterocyclic nucleus selected from the group consisting of those of the benzothiazole series, those of the napthothiazole series, those of the benzoselenazole series, those of the naphthoselenazole series, those of the benzoxazole series, those of the naphthoxazole series, those of the 2-quinoline series, those of the 4-quinoline series, those of the benzimidazole series, and those of the 5,6-benzoquinoline series, and $Z_1$ represents the non-metallic atoms necessary to complete a heterocyclic nucleus selected from the group consisting of those of the benzoxazole series, those of the naphthoxazole series, those of the benzoselenazole series, those of the naphthoselenazole series, those of the benzothiazole series, and those of the naphthothiazole series, and at least one aromatic compound, containing at least one sulfo group, selected from the class consisting of (a) a carbocyclic compound selected from those represented by the following general formula:

(2)          D—SO$_3$H wherein D represents an aromatic group comprising an aromatic ring selected from the class consisting of a biphenyl ring, a terphenyl ring, and an aromatic group containing at least 2 benzene rings fused together, (b) a water-soluble salt of a compound represented by said Formula 2, and (c) a dibenzothiophene dioxide compound selected from those represented by the following general formula:

(3)
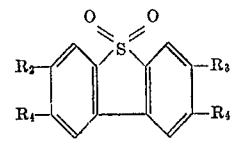

wherein $R_2$ represents a member selected from the group consisting of an acylamido group and a sulfo group, $R_3$ represents a member selected from the group consisting of an acylamido group and a sulfoaryl group, and $R_4$ represents a member selected from the group consisting of a hydrogen atom and a sulfo group, said dibenzothiophene dioxide compound containing at least one sulfo group.

2. A photographic gelatino-silver-halide developing-out emulsion sensitized with a supersensitizing combination of at least one dicarbocyanine dye selected from those represented by the following general formula:

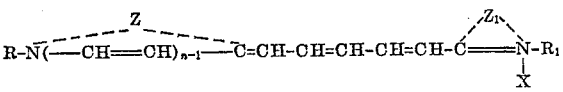

wherein R and $R_1$ each represents an alkyl group containing from 1 to 4 carbon atoms, $n$ represents a positive integer of from 1 to 2, X represents an acid radical, Z represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoxazole series, those of the naphthoxazole series, those of the 2-quinoline series, those of the 4-quinoline series, those of the benzimidazole series, and those of the 5,6-benzoquinoline series, and $Z_1$ represents the non-metallic atoms necessary to complete a heterocyclic nucleus selected from the group consisting of those of the benzoxazole series, those of the naphthoxazole series, those of the benzoselenazole series, those of the naphthoselenazole series, those of the benzothiazole series, and those of the naphthothiazole series, and at least one dibenzothiophene dioxide compound selected from those represented by the following general formula:

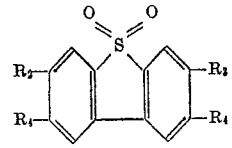

wherein $R_2$ represents a member selected from the group consisting of an acylamido group and a sulfo group, $R_3$ represents a member selected from the group consisting of an acylamido group and a sulfoaryl group, and $R_4$ represents a member selected from the group consisting of a hydrogen atom and a sulfo group, said dibenzothiophene dioxide compound containing at least one sulfo group.

3. A photographic gelatino-silver-halide developing-out emulsion sensitized with a supersensitizing combination of at least one dicarbocyanine dye selected from those represented by the following general formula:

(1)
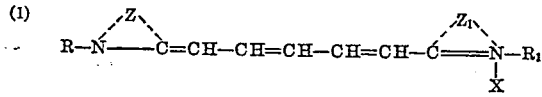

wherein R and $R_1$ each represents an alkyl group containing from 1 to 2 carbon atoms, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series and those of the benzoselenazole series, and at least one aromatic compound, containing at least one sulfo group, selected from the class consisting of (a) a carbocyclic compound selected from those represented by the following general formula:

(2)     

wherein D represents an aromatic group comprising an aromatic ring selected from the class consisting of a biphenyl ring, a terphenyl ring and an aromatic group containing at least 2 benene rings fused together, (b) a water-soluble salt of a compound represented by said Formula 2, and (c) a dibenzothiophene dioxide compound selected from those represented by the following general formula:

(3)
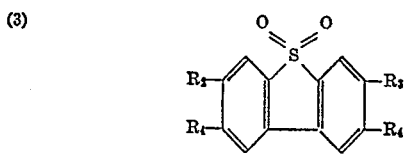

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

4. A photographic gelatino-silver-halide developing-out emulsion as defined in claim 3, wherein the silver halide is silver bromiodide.

5. A photographic gelatino-silver-halide developing-out emulsion sensitized with a supersensitizing combination of at least one dicarbocyanine dye selected from those represented by the following general formula:

(1)
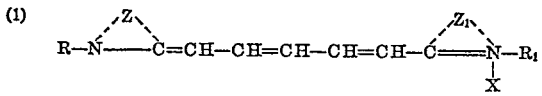

wherein R and $R_1$ each represents an alkyl group containing from 1 to 2 carbon atoms, X represents an acid radical, Z represents the non-metallic atoms necessary to complete a heterocyclic nucleus of the benzothiazole series and $Z_1$ represents the non-metallic atoms necessary to complete a heterocyclic nucleus of the benzoxazole series, and at least one aromatic compound, containing at least one sulfo group, selected from the class consisting of (a) a carbocyclic compound selected from those represented by the following general formula:

(2)     

wherein D represents an aromatic group comprising an aromatic ring selected from the class consisting of a biphenyl ring, a terphenyl ring and an aromatic group containing at least 2 benzene rings fused together, (b) a water-soluble salt of a compound represented by said Formula 2 and (c) a dibenzothiophene dioxide compound selected from those represented by the following general formula:

(3)
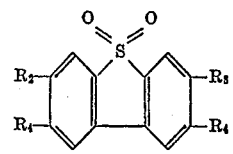

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

6. A photographic gelatino-siliver-halide developing-out emulsion sensitized with a supersensitizing combination of at least one dicarbocyanine dye selected from those represented by the following general formula:

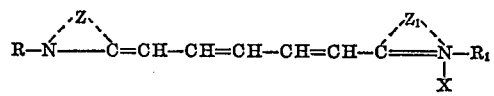

wherein R and $R_1$ each represents an alkyl group containing from 1 to 2 carbon atoms, X represents an acid radical, Z represents the non-metallic atoms necessary to complete a heterocyclic nucleus of the benzothiazole series and $Z_1$ represents the non-metallic atoms necessary to complete a heterocyclic nucleus of the benzoxazole series, and at least one dibenzothiophene compound selected from those represented by the following general formula:

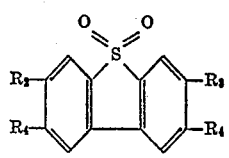

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

7. A photographic gelatino-silver-halide developing-out emulsion sensitized with a supersensitizing combination of 3,3'-diethyloxathiadicarbocyanine iodide and 3,7-bis(4-methoxy-3-sulfobenzamido)dibenzothiophene dioxide sodium salt.

8. A photographic gelatino-silver-halide developing-out emulsion sensitized with a supersensitizing combination of 3,3'-diethyloxathiadicarbocyanine iodide and 4',4''-bis(2-methoxy-5-sulfobenzamido)-p-terphenyl ethanolamine salt.

9. A photographic gelatino-silver-halide developing-out emulsion sensitized with a supersensitizing combination of at least one dicarbocyanine dye selected from those represented by the following general formula:

(1)
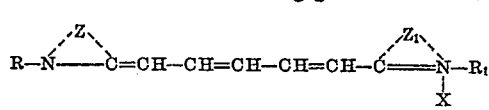

wherein R and $R_1$ each represents an alkyl group containing from 1 to 2 carbon atoms, X represents an acid radical and Z and $Z_1$ each represents the non-metallic atoms necessary to complete a heterocyclic nucleus of the benzothiazole series, and at least one aromatic compound, containing at least one sulfo group, selected from the class consisting of (a) a carbocyclic compound selected from those represented by the following general formula:

(2)  D—SO₃H wherein D represents an aromatic group comprising an aromatic ring selected from the class consisting of a biphenyl ring, a terphenyl ring and an aromatic group containing at least 2 benzene rings fused together, (b) a water-soluble salt of a compound represented by said Formula 2, and (c) a dibenzothiophene dioxide compound selected from those represented by the following general formula:

(3)

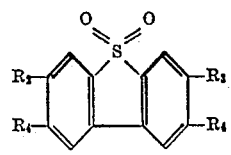

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

10. A photographic gelatino-silver-halide developing-out emulsion sensitized with a supersensitizing combination of at least one dicarbocyanine dye selected from those represented by the following general formula:

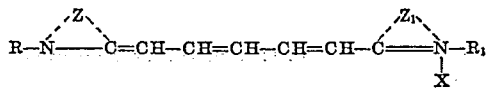

wherein R and $R_1$ each represents an alkyl group containing from 1 to 2 carbon atoms, X represents an acid radical, and Z and $Z_1$ each represents the non-metallic atoms necessary to complete a heterocyclic nucleus of the benzothiazole series, and at least one dibenzothiophene compound selected from those represented by the following general formula:

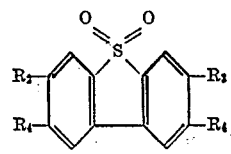

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

11. A photographic gelatino-silver-halide developing-out emulsion sensitized with a supersensitizing combination of 3,3'-diethylthiadicarbocyanine iodide and 3-[4-(4-methoxy - 3 - sulfobenzamido)phenyl] - 7(4 - methoxy-3-sulfobenzamido)dibenzothiophene dioxide sodium salt.

12. A photographic gelatino-silver-halide developing-out emulsion sensitized with a supersensitizing combination of at least one dicarbocyanine dye selected from those represented by the following general formula:

(1) 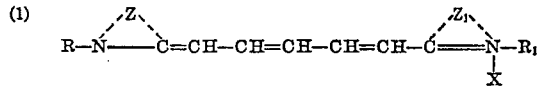

wherein R and $R_1$ each represents an alkyl group containing from 1 to 2 carbon atoms, X represents an acid radical and Z and $Z_1$ each represents the non-metallic atoms necessary to complete a heterocyclic nucleus of the benzoselenazole series, and at least one aromatic compound, containing at least one sulfo group, selected from the class consisting of (a) a carbocyclic compound selected from those represented by the following general formula:

(2)  D—SO₃H wherein D represents an aromatic group comprising an aromatic ring selected from the class consisting of a biphenyl ring, a terphenyl ring and an aromatic group containing at least 2 benzene rings fused together, (b) a water-soluble salt of a compound represented by said Formula 2 and (c) a dibenzothiophenedioxide compound selected from those represented by the following general formula:

(3)

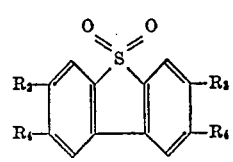

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

13. A photographic gelatino-silver-halide developing-out emulsion sensitized with a supersensitizing combination of at least one dicarbocyanine dye selected from those represented by the following general formula:

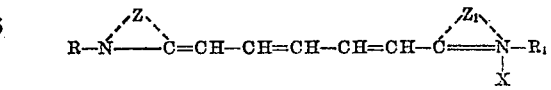

wherein R and $R_1$ each represents an alkyl group containing from 1 to 2 carbon atoms, X represents an acid radical, and Z and $Z_1$ each represents the non-metallic atoms necessary to complete a heterocyclic nucleus of the benzoselenazole series, and at least one dibenzothiophene compound selected from those represented by the following general formula:

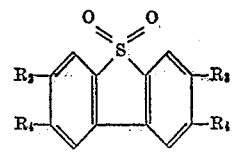

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

14. A photographic gelatino-silver-halide developing-out emulsion sensitized with a supersensitizing combination of 3,3'-diethylselenadicarbocyanine iodide and 3-[4-(4 - methoxy - 3-sulfobenzamido)phenyl] - 7 - (4 - methoxy-3-sulfobenzamido)dibenzothiophene dioxide sodium salt.

15. A photographic gelatino-silver-halide developing-out emulsion sensitized with a supersensitizing combination of at least one dicarbocyanine dye selected from those represented by the following general formula:

(1) 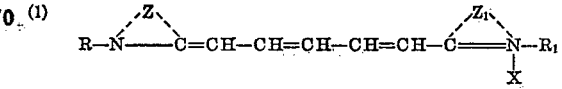

wherein R and $R_1$ each represents an alkyl group containing from 1 to 2 carbon atoms, X represents an acid radical and Z and $Z_1$ each represents the non-metallic atoms necessary to complete a heterocyclic nucleus of the naphthothiazole series, and at least one aromatic compound, containing at least one sulfo group, selected from the class consisting of (a) a carbocyclic compound selected from those represented by the following general formula:

(2)                D—SO$_3$H wherein D represents an aromatic group comprising an aromatic ring selected from the class consisting of a biphenyl ring, a terphenyl ring and an aromatic group containing at least 2 benzene rings fused together, (b) a water-soluble salt of a compound represented by said Formula 2, and (c) a dibenzothiophene dioxide compound selected from those represented by the following general formula:

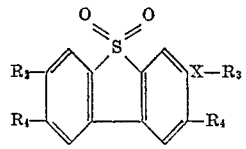

wherein $R_2$ represents a member selected from the group consisting of an acylamido group and a sulfo group, $R_3$ represents a member selected from the group consisting of an acylamido group and a sulfoaryl groups containing from 6 to 12 carbon atoms, and $R_4$ represents a member selected from the group consisting of a hydrogen atom and a sulfo group, said dibenzothiophene dioxide compound containing at least one sulfo group.

16. A photographic gelatino-silver-halide developing-out emulsion sensitized with a supersensitizing combination of at least one dicarbocyanine dye selected from those represented by the following general formula:

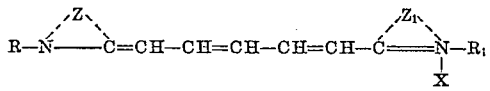

wherein R and $R_1$ each represents an alkyl group containing from 1 to 2 carbon atoms, X represents an acid radical, and Z and $Z_1$ each represents the non-metallic atoms necessary to complete a heterocyclic nucleus of the naphthothiazole series, and at least one dibenzothiophene compound selected from those represented by the following general formula:

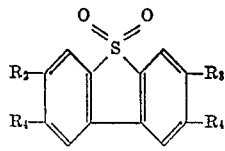

wherein $R_2$ represents a member selected from the group consisting of an acylamido group and a sulfo group, $R_3$ represents a member selected from the group consisting of an acylamido group and a sulfoaryl group containing from 6 to 12 carbon atoms, and $R_4$ represents a member selected from the group consisting of a hydrogen atom and a sulfo group, said dibenzothiophene dioxide compound containing at least one sulfo group.

17. A photographic gelatino-silver-halide developing-out emulsion sensitized with a supersensitizing combination of 3,3'-diethyl-4,5,4',5'-dibenzothiadicarbocyanine iodide and 3-[4-(4-methoxy-3-sulfobenzamido)phenyl]-7-(4 - methoxy - 3 - sulfobenzamido)dibenzothiophene dioxide sodium salt.

18. A photographic silver halide emulsion capable of producing a cyan dye image comprising a silver halide emulsion containing a dispersion of a color-forming phenolic compound capable of reacting with a primary aromatic amine developing agent, and at least one dicarbocyanine dye selected from those represented by the following general formula:

(1) 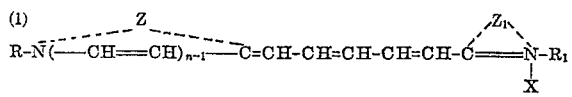

wherein R and $R_1$ each represents an alkyl group containing from 1 to 4 carbon atoms, n represents a positive integer of from 1 to 2, X represents an acid radical, Z represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoxazole series, those of the naphthoxazole series, those of the 2-quinoline series, those of the 4-quinoline series, those of the benzimidazole series, and those of the 5,6-benzoquinoline series, and $Z_1$ represents the non-metallic atoms necessary to complete a heterocyclic nucleus selected from the group consisting of those of the benzoxazole series, those of the naphthoxazole series, those of the benzoselenazole series, those of the naphthoselenazole series, those of the benzothiazole series, and those of the naphthothiazole series, and at least one aromatic compound, containing at least one sulfo group, selected from the class consisting of (a) a carbocyclic compound selected from those represented by the following general formula:

(2)                D—SO$_3$H wherein D represents an aromatic group comprising an aromatic ring selected from the class consisting of a biphenyl ring, a terphenyl ring, and an aromatic group containing at least 2 benzene rings fused together, (b) a water-soluble salt of a compound represented by said Formula 2, and (c) a dibenzothiophene dioxide compound selected from those represented by the following general formula:

(3) 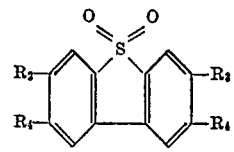

wherein $R_2$ represents a member selected from the group consisting of an acylamido group and a sulfo group, $R_3$ represents a member selected from the group consisting of an acylamido group and a sulfoaryl group, and $R_4$ represents a member selected from the group consisting of a hydrogen atom and a sulfo group, said dibenzothiophene dioxide compound containing at least one sulfo group.

References Cited in the file of this patent

UNITED STATES PATENTS

| | | |
|---|---|---|
| 2,186,717 | Eggert et al. | Jan. 9, 1940 |
| 2,412,815 | Kendall et al. | Dec. 17, 1946 |
| 2,534,050 | Murray | Dec. 12, 1950 |
| 2,701,197 | Thirtle et al. | Feb. 1, 1955 |
| 2,725,292 | Graham et al. | Nov. 29, 1955 |
| 2,759,816 | Minsk | Aug. 21, 1956 |
| 2,848,329 | Chechak et al. | Aug. 19, 1958 |

FOREIGN PATENTS

| | | |
|---|---|---|
| 484,289 | Canada | June 24, 1952 |

UNITED STATES PATENT OFFICE
Certificate of Correction

Patent No. 2,937,089                                                             May 17, 1960

Jean E. Jones et al.

It is hereby certified that error appears in the printed specification of the above numbered patent requiring correction and that the said Letters Patent should read as corrected below.

Column 1, lines 59 and 60, the left-hand portion of the formula should appear as shown below instead of as in the patent:

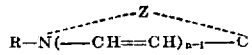

column 4, lines 15 to 19, the right-hand portion of the formula should appear as shown below instead of as in the patent:

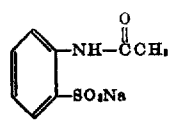

column 12, line 37, Coupler (3), for that portion reading "-(2,4-di-" read — 2-(2,4-di- —; column 21, lines 19 to 23, the right-hand portion of the formula should appear as shown below instead of as in the patent:

line 27, for "a sulfoaryl groups" read —a sulfoaryl group—.

Signed and sealed this 29th day of November 1960.

[SEAL]

Attest:
KARL H. AXLINE,
*Attesting Officer.*
                                                                                        ROBERT C. WATSON,
                                                                                        *Commissioner of Patents.*